No. 643,099. Patented Feb. 13, 1900.
J. H. AYASSE.
PRESSURE REGULATING DEVICE.
(Application filed July 27, 1899.)
(No Model.) 2 Sheets—Sheet 1.

WITNESSES: INVENTOR:
John Henry Ayasse
BY
ATTORNEYS.

No. 643,099. Patented Feb. 13, 1900.
J. H. AYASSE.
PRESSURE REGULATING DEVICE.
(Application filed July 27, 1899.)

(No Model.) 2 Sheets—Sheet 2.

WITNESSES: INVENTOR:
Alfred R. Krousse. John Henry Ayasse,
Russell M. Everett. BY
Drake & Co.
ATTORNEYS.

UNITED STATES PATENT OFFICE.

JOHN HENRY AYASSE, OF NEWARK, NEW JERSEY.

PRESSURE-REGULATING DEVICE.

SPECIFICATION forming part of Letters Patent No. 643,099, dated February 13, 1900.

Application filed July 27, 1899. Serial No. 725,259. (No model.)

*To all whom it may concern:*

Be it known that I, JOHN HENRY AYASSE, a citizen of the United States, residing at Newark, in the county of Essex and State of New Jersey, have invented certain new and useful Improvements in Pressure-Regulating Devices; and I do hereby declare the following to be a full, clear, and exact description of the invention, such as will enable others skilled in the art to which it appertains to make and use the same, reference being had to the accompanying drawings, and to letters of reference marked thereon, which form a part of this specification.
This invention has for its objects a reduction in the cost of maintaining a regular and even compression of liquid in storage-casks of beer, ale, and the like in breweries; to more certainly prevent undue compression due to a failure of the regulator to operate; to enable the regulating devices to be adjusted with facility, convenience, and ease; to enable the beer or liquids in a number of series of casks to be either maintained at a uniform degree of compression, especially when the said beer or liquid is all to be drawn off into one variety of packages—either into kegs or bottles—or without material trouble or labor to be maintained at different degrees of compression, the beer of one cask being at one degree of compression—suitable to be drawn into bottles, for instance—and the beer of the next cask in the series at a higher or lower degree, suitable for a different kind of package, and to obtain other advantages and results, some of which may be referred to hereinafter in connection with the description of the working parts.

The invention consists in the system of pressure-regulating devices for automatically maintaining beer or similar fluids in different storage vessels at a uniform degree or at variant degrees of compression and in the arrangements and combinations of parts of the same, all substantially as will be hereinafter set forth, and finally embraced in the clauses of the claim.

Figure 1:
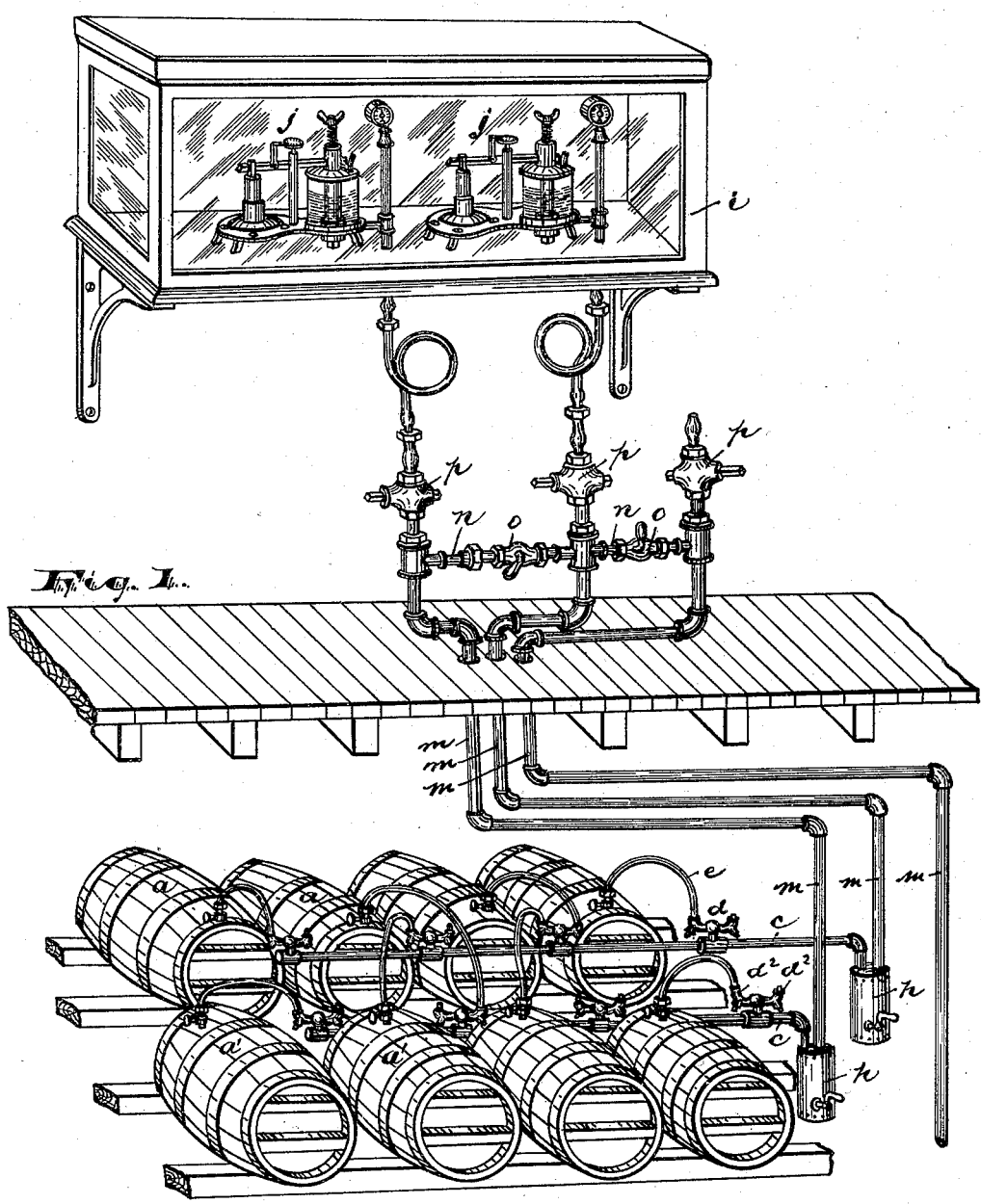
Figure 2:
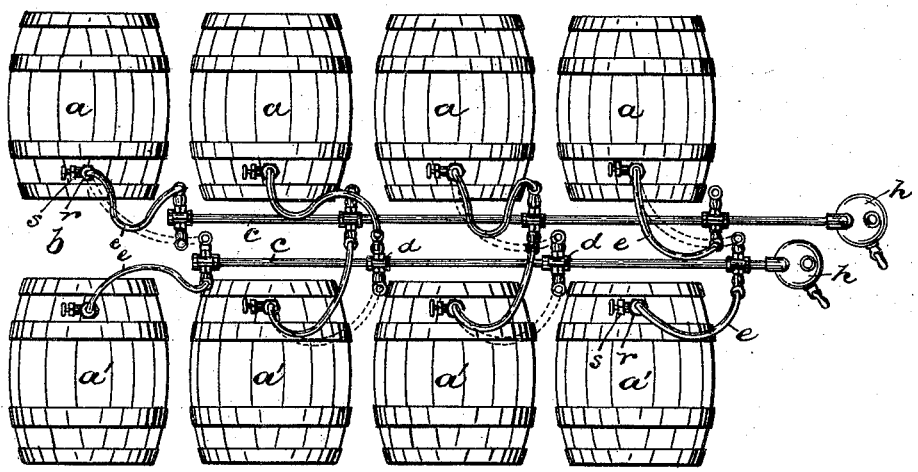
Figure 3:
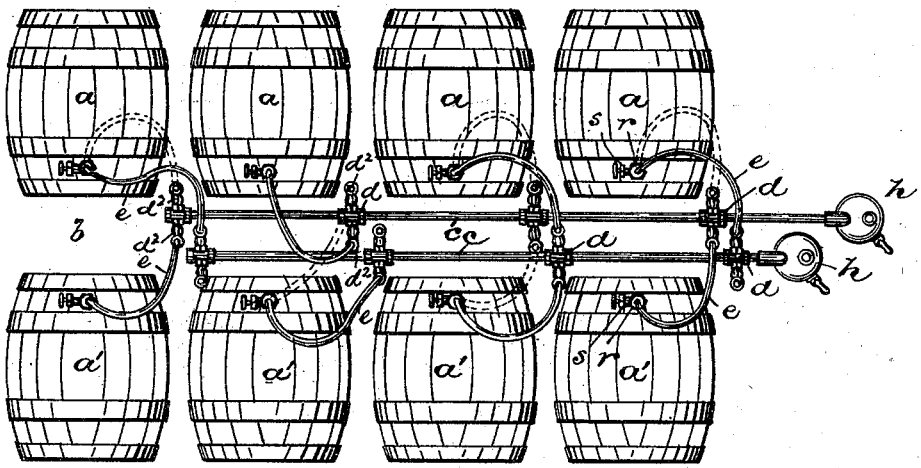
Figure 4:
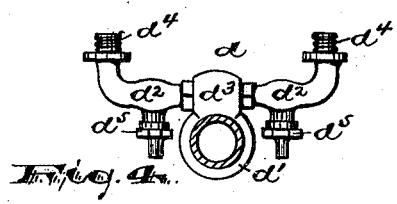

Referring to the accompanying drawings, in which like letters of reference indicate corresponding parts in each of the several views, Figure 1 is a general view illustrating the construction and arrangements of the various parts. Figs. 2 and 3 indicate series of casks connected in the system; and Fig. 4 is a detail of a certain pipe connection, all of which will be hereinafter more fully explained.

In said drawings, $a\ a\ a\ a'\ a'\ a'$ indicate two series of casks or storage-packages which in practice may contain one hundred and twenty-five barrels, more or less, each. These casks are ordinarily arranged in opposite sides of a passage-way $b$, through which an attendant may conveniently pass, and are provided with ordinary means (not shown) for racking off the liquid into small packages and replenishing the casks with fluid. It is an ordinary practice to fill said casks about once every one or two months, and the fluid thus stored undergoes a fermenting process whereby its flavor is improved.

To prevent the gaseous product of fermentation from producing too high a compression and to effectually and with convenience and ease maintain a proper degree or degrees of compression in the casks are objects of my improvements.

Along the passage way or ways $b$, with their ends or heads toward said way, are arranged the casks $a\ a'$, and in said way or ways, preferably at opposite sides thereof, are arranged substantially horizontal and preferably parallel pipes $c\ c$, having series of branch-pipe connections $d$, disposed, preferably, at points adjacent to the openings between the casks, the said pipes $c$ preferably being in sections to permit the insertion of the connection between the sections thereof, as clearly illustrated in Figs. 2 and 3. The construction of said connections $d$ is shown on a large scale in Fig. 4, where $d'$ represents the body of the connection, adapted to receive at opposite sides or ends the ends of the sections of the pipe $c$ and hold said sections together and in proper alinement. $d^2$ are valved members of the connection $d$, adapted to be screwed into opposite sides of the arm $d^3$ of the body $d'$, the opposite valved members being thus coupled to and the passages therein being in open communication with the passages of the pipe-sections $c$. At their upwardly-projecting ends the members $d^2$ are provided with threads $d^4$, Fig. 4, or other means for holding the branch pipes $e\ e\ e$ thereto, the said members having an upward turn to properly receive the downwardly-extending branch pipes. $d^5$ $d^5$ indicate the valves by means of which a flow may be opened or closed through the members by any suitable key or handle. Said branch pipes are flexible and are preferably of the construction of ordinary hose. These are of a length sufficient to extend from any one of the connections $d$ to the top coupling of any one of the four casks nearly adjacent. At their ends away from the connections $d$ they are provided with means for attachment to the valved vent connections $r$ $r$ of the casks, said means permitting a ready and convenient separation when detachment is desirable.

In practice by the construction of pipes and flexible branch pipes described the attendant can readily change the cask connections of any and all the casks to effect either a high or low pressure, or he can alternate the pressures in the casks, so that the pressure will be high in one and low in the other to accord with the conditions. Thus if the fluid of any one cask or all the casks is to be bottled then the branches are attached to one of said pipes $c$; but if the fluid is to be drawn off into kegs the branches are to be changed to the other pipes $c$, as will be understood.

At the ends of the pipes $c$ are drip-receptacles $h$, into which fluid may drain from the pipes $c$ and connections, and from said receptacles are pipes $m$ $m$ $m$, leading from the horizontal pipes upward to a location close to a case $i$, containing pressure-regulating devices $j$ $j$. Between the floor of the room containing the said case $i$ and said case the said pipes $m$ are connected, so that there can be an open communication one with the other, the transverse connecting-pipes $n$ $n$ being each furnished with a valve or cock $o$, by means of which communication may be closed at the convenience of the attendant. Between said connecting-pipes $n$ and the pressure-regulating device $j$ the pipes $m$ are provided with cocks or valves $p$, so that communication may be cut off from any one of the regulating devices.

The pressure-regulators preferred are such as I have shown and described in a coördinate case now pending in the Patent Office to be issued, by which regulators the gas produced by fermentation is allowed to escape at a given pressure.

When it is found desirable to make the pressure uniform in all the casks of a series, the branch pipes of the two series of casks are all connected to one of the pipes $c$ in connection with the regulating device set at the desired pressure. To permit of such an arrangement, the members $d^2$ of the connections are on each pipe equal to the whole number of casks disposed adjacent to said pipe, or perhaps, more correctly, each connection $d$ is provided with members $d^2$ to receive two branch pipes, the said members being provided with valves or cocks to enable the passage of the member not in use to be closed.

In frequent practice the casks are not regularly of the same uniform pressure for either bottling or packing in kegs. My construction permits the casks to be connected to either of the pipes at or in the passage-way $b$, the branch pipes being interchangeable and of a length sufficient to permit of being attached to the connections $d$ of either of the pipes $c$ when connected to the casks. Said branch pipes are also separable or changeable in relation to the casks, so as to be coupled to any one of said casks, and the cask connections $r$ are provided with cocks $s$, permitting a closure of the vent-passage from the cask preliminary to a removal or change in the branch pipes.

Having thus described the invention, what I claim as new is—

1. The combination with a pipe or ducts having independent passages and connections thereof with the casks, of a transverse pipe leading from one pipe or duct to the other and provided with controlling-cocks and means for regulating the pressure within said pipes, substantially as set forth.

2. The combination with two parallel series of casks having a way or passage $b$, therebetween, of two parallel pipes $c$, $c$, disposed at said way and connected with different pressure-regulating devices, said pipes each having a series of connections $d$, and flexible branch pipes separable from said connections and adapted to extend from the connections of either of the said pipes $c$, to the casks, and valves stationed at the cask connections and at the pipe connection $d$, substantially as set forth.

3. The combination with two series of casks having a way, a passage $b$, therebetween, of two pipes $c$, $c$, connecting with different pressure-regulating devices, said pipes $c$, each having a series of connections $d$, with oppositely-disposed members $d^2$, to receive the interchangeable branch pipes, said members $d^2$, each having a valve or cock $d^5$, and flexible branch pipes separable from the connections $d$, and adapted to extend from the connections of either of the pipes $c$, to the casks, and valves for closing out-passage of gas from the casks when the branch pipes are being changed, substantially as set forth.

4. The combination with two series of casks having a way or passage $b$, therebetween, of two pipes $c$, $c$, connecting with different pressure-regulating devices, said pipes $c$, each having a series of connections to receive branch pipes, said connections being provided with valves or cocks closing outflow of gas therefrom, a series of interchangeable flexible pipes adapted to extend from the cask to either of the said pipes $c$, whereby the pressure of the casks can be raised or lowered to accord with the pressure of either one or the other of the pipes, substantially as set forth.

5. The combination with different storage casks and pipes $c, c$, connecting with different pressure-regulating devices adapted to be set to automatically maintain the casks in open connection therewith at desired pressures, interchangeable branch pipes, a transverse pipe $n$, connecting the pipes $c, c$, and having a valve or cock $o$, and valves $p$, disposed between the connection of said pipes $c$, $n$, and the regulating devices, substantially as and for the purposes set forth.

In testimony that I claim the foregoing I have hereunto set my hand this 24th day of July, 1899.

JOHN HENRY AYASSE.

Witnesses:
CHARLES H. PELL,
C. B. PITNEY.